(12) United States Patent
Lee et al.

(10) Patent No.: US 12,062,816 B2
(45) Date of Patent: Aug. 13, 2024

(54) LITHIUM PRIMARY BATTERY HAVING IMPROVED OUTPUT CHARACTERISTICS, AND MANUFACTURING METHOD THEREFOR

(71) Applicant: VITZROCELL CO. LTD., Dangjin-si (KR)

(72) Inventors: Chae-Bong Lee, Asan-si (KR); Se-Yong Park, Seongnam-si (KR); Ji-Hyeok Jang, Chungcheongnam-do (KR); Sung-Hoon Jung, Cheonan-si (KR)

(73) Assignee: VITZROCELL CO. LTD., Dangjin-si (KR)

( * ) Notice: Subject to any disclaimer, the term of this patent is extended or adjusted under 35 U.S.C. 154(b) by 160 days.

(21) Appl. No.: 17/416,780

(22) PCT Filed: Nov. 20, 2019

(86) PCT No.: PCT/KR2019/015970
§ 371 (c)(1),
(2) Date: Jun. 21, 2021

(87) PCT Pub. No.: WO2020/141724
PCT Pub. Date: Jul. 9, 2020

(65) Prior Publication Data
US 2022/0077472 A1   Mar. 10, 2022

(30) Foreign Application Priority Data

Jan. 2, 2019   (KR) .......... 10-2019-0000346

(51) Int. Cl.
*H01M 4/06* (2006.01)
*H01M 4/02* (2006.01)
(Continued)

(52) U.S. Cl.
CPC ............... *H01M 6/02* (2013.01); *H01M 4/06* (2013.01); *H01M 4/583* (2013.01); *H01M 4/661* (2013.01);
(Continued)

(58) Field of Classification Search
CPC .......... H01M 4/06; H01M 4/10; H01M 4/382; H01M 4/583; H01M 4/587; H01M 4/661;
(Continued)

(56) References Cited

U.S. PATENT DOCUMENTS

2005/0042516 A1* 2/2005 Oh .................. H01M 50/457
429/246
2009/0136832 A1* 5/2009 Mitsuda ................... H01G 9/10
429/94

(Continued)

FOREIGN PATENT DOCUMENTS

JP        2016-58220 A     4/2016
KR   20-1999-0040749 U   12/1999
(Continued)

OTHER PUBLICATIONS

Machine Translation of Goo (Year: 2017).*
(Continued)

*Primary Examiner* — Matthew T Martin
*Assistant Examiner* — Ankith R Sripathi
(74) *Attorney, Agent, or Firm* — Hauptman Ham, LLP

(57) ABSTRACT

Provided are a lithium primary battery in which a structure of an electrode closely related to output characteristics of the battery is improved to expand a reaction area, thus improving the output characteristics of the battery, and a method for manufacturing the lithium primary battery.

11 Claims, 5 Drawing Sheets

(51) Int. Cl.
   *H01M 4/583*   (2010.01)
   *H01M 4/66*   (2006.01)
   *H01M 4/74*   (2006.01)
   *H01M 6/02*   (2006.01)
   *H01M 6/14*   (2006.01)

(52) U.S. Cl.
   CPC ............... *H01M 4/74* (2013.01); *H01M 6/14* (2013.01); *H01M 2004/021* (2013.01)

(58) Field of Classification Search
   CPC .......... H01M 4/626; H01M 4/74; H01M 6/02; H01M 6/14; H01M 6/103; H01M 2004/021
   See application file for complete search history.

(56) References Cited

U.S. PATENT DOCUMENTS

2013/0230764 A1   9/2013   Park et al.
2016/0322647 A1*  11/2016  Lee .................... H01M 6/14

FOREIGN PATENT DOCUMENTS

| KR | 10-2002-0039570 A | 5/2002 |
| KR | 10-0360169 B1 | 11/2002 |
| KR | 10-2003-0066172 A | 8/2003 |
| KR | 10-2007-0079910 A | 8/2007 |
| KR | 10-0774445 B1 | 11/2007 |
| KR | 10-0873166 B1 | 12/2008 |
| KR | 10-2013-0086413 A | 8/2013 |
| KR | 10-1296203 B1 | 8/2013 |
| KR | 10-2015-0083634 A | 7/2015 |
| KR | 10-2015-0089388 A | 8/2015 |
| KR | 10-2015-0132782 A | 11/2015 |
| KR | 10-1780686 B1 | 9/2017 |
| KR | 10-1996543 B1 | 7/2019 |

OTHER PUBLICATIONS

International Search Report issued Mar. 11, 2020, corresponding to International Application No. PCT/KR2019/015970.

The extended European Search Report dated Jan. 21, 2022 for corresponding European Patent Application No. 19908031.8.

* cited by examiner

LITHIUM PRIMARY BATTERY HAVING IMPROVED OUTPUT CHARACTERISTICS, AND MANUFACTURING METHOD THEREFOR

CROSS-REFERENCE TO RELATED APPLICATION

The present application is a national stage filing under 35 U.S.C § 371 of PCT application number PCT/KR2019/015970 filed on Nov. 20, 2019 which is based upon and claims the benefit of priorities to Korean Patent Application No. 10-2019-0000346 filed on Jan. 2, 2019, in the Korean Intellectual Property Office. Both of the aforementioned applications are hereby incorporated by reference in their entireties.

TECHNICAL FIELD

The present disclosure relates to a lithium primary battery having improved output characteristics and a method for manufacturing the lithium primary battery, and more particularly, to a lithium primary battery in which a structure of an electrode closely related to output characteristics of the battery is improved to expand a reaction area, thus improving the output characteristics of the battery, and a method for manufacturing the lithium primary battery.

BACKGROUND ART

Generally, a battery, which is a driving source for generating electricity by causing oxidation and reduction of chemical substances, is easy to carry and may be manufactured in small size, thus being used to supply electricity to equipment of various types and purposes.

A lithium thionyl chloride (Li/SoC12) cell that is a lithium primary battery has been widely used as a power source having high capacity and high long-term reliability, due to its superior energy density and high operating voltage of 3V or higher.

The lithium thionyl chloride cell also has a far evener operating voltage period than other batteries.

Such lithium thionyl chloride cells are classified into a bobbin type and a wound type, depending on their internal structures.

In particular, among types of the lithium thionyl chloride cells, a bobbin type cell, which is available for a long time at low electric current and has a low self-discharge rate, has been applied for memory backup and as a power source for smart meter communication, and a demand for the bobbin type cell is continuously increasing.

FIG. 1 is a cross-sectional view of a conventional lithium primary cell, and FIG. 2 is a plane view of the conventional lithium primary cell.

Referring to FIGS. 1 and 2, a conventional lithium primary cell 100 has a bobbin structure including a case 110, a lithium anode 120, a cathode 130, a separator 140, and a header 150. Inside the case 110, an electrolyte is impregnated. The lithium anode 120 is attached to an inner wall of the case 110.

The cathode 130 is inserted into an inner center portion of the case 110. In this case, as the cathode 130, a cylindrical form molded by granular molding may be used.

The separator 140 may be disposed between the lithium anode 120 and the cathode 130. The separator 140 may be disposed between the lithium anode 120 and the cathode 130 to electrically separate the lithium anode 120 from the cathode 130.

The header 150 covers a top of the case 110 to seal the case 110. The header 150 is bonded to the case 110 using dot welding, laser welding, etc. In this case, the header 150 may be coupled with glass 170, and a header pin 160 is engaged with a center portion of the header 150.

Although not shown specifically in the drawing, an electrolyte inlet (not shown) for impregnation of an electrolyte is included in the header 150.

An upper insulation plate 145 is further disposed on a bottom surface of the header 150.

The above-described bobbin-type lithium primary cell 100 is manufactured in such a manner that the lithium anode 120 is attached to the inside of the case 110 and the bobbin-type cathode 130 is enclosed by the separator 140 for insertion into the case 110, and then is connected to the header pin 160 for injection of the electrolyte.

Recently, with the emergence of a new communication scheme, some smart meter communication power sources require higher and longer-lasting current capacity than with conventional sources, i.e., a long-period pulse.

However, the conventional bobbin-type lithium primary cell has a structural limitation of failing to satisfy a long-period pulse due to its structural characteristics.

As a related prior document, Korean Patent Registration Gazette No. 10-0873166 (published on Dec. 10, 2008) discloses a lithium/thionyl chloride cell.

DETAILED DESCRIPTION OF INVENTION

Technical Problem

The present disclosure provides a lithium primary battery in which electrical output characteristics are improved when compared to a conventional bobbin-type lithium primary cell, while maintaining stability of the bobbin-type lithium primary cell, by using a wound cathode, and a method for manufacturing the lithium primary battery.

Solution to Problem

According to an aspect of the present disclosure, a lithium primary battery having improved output characteristics includes a case including an open top and having an electrolyte impregnated therein, a lithium cathode attached to an inner wall of the case, a wound anode disposed in an inner center portion of the case and wound at least twice, a separator disposed between the lithium anode and the wound cathode, and a header covering the top of the case to seal the case, in which the wound cathode is wound and inserted into the inner center portion of the case, and the lithium cathode and the separator are not wound.

The wound cathode may include a cathode collector wound at least twice to have a hollow in an inner center portion thereof and a cathode active material layer coated onto at least a surface of the cathode collector.

In this case, the cathode collector may be formed of nickel mesh, and the cathode active material layer may be formed of carbon powder.

The wound cathode may have a thickness of about 0.1 mm through about 3 mm.

The wound cathode may further include a current collector attached to at least a surface of the cathode collector and connected to a header pin engaged with a header and an elastic member disposed in a hollow portion of the cathode collector to mutually fix wound parts of the cathode collector wound at least twice.

The elastic member may be coupled to the hollow portion of the cathode collector in a fit-coupling manner to fix the cathode collector.

According to another aspect of the present disclosure, a method for manufacturing a lithium primary battery includes (a) attaching a lithium anode and a separator to an inner wall of a case having an open top, (b) inserting a wound cathode wound at least twice into an inner center portion of the case having the lithium anode and the separator attached thereto, and (c) after welding the top of the case with a header, injecting an electrolyte into the case through an electrolyte inlet of the header and sealing the case, in which the wound cathode is wound and inserted into the inner center portion of the case, and the lithium cathode and the separator are not wound.

The wound cathode may include a cathode active material layer in which carbon powder is coated onto a cathode collector formed of nickel mesh.

The wound cathode may be formed to have a thickness of about 0.1 mm through about 3 mm.

In (b), the wound cathode may include a current collector attached to at least a surface of the cathode collector and connected to a header pin engaged with a header and an elastic member disposed in a hollow portion of the cathode collector to mutually fix wound parts of the cathode collector wound at least twice.

Advantageous Effects of Invention

In a lithium primary battery having improved output characteristics and a method for manufacturing the lithium primary battery according to the present disclosure, a wound cathode in which a cathode collector coated with carbon powder is wound around nickel mesh is fixed by an elastic member disposed in an inner center portion of a case, thereby improving electrical output characteristics when compared to a conventional bobbin-type lithium primary cell.

Moreover, in the lithium primary battery having improved output characteristics and a method for manufacturing the lithium primary battery according to the present disclosure, by applying the wound cathode in which only the cathode, instead of all of a lithium anode, a separator, and the cathode, is wound, any shape change does not occur in the lithium anode and the separator, thus improving electrical output characteristics when compared to a conventional bobbin-type lithium primary cell without a change in an electrochemical capacity.

As a result, the lithium primary battery having improved output characteristics and a method for manufacturing the lithium primary battery according to the present disclosure may improve electrical output characteristics by maximizing an electrode area with insertion of a wound cathode, which is wound at least twice, into the inner center portion of the case.

EMBODIMENTS OF INVENTION

Figure 1:
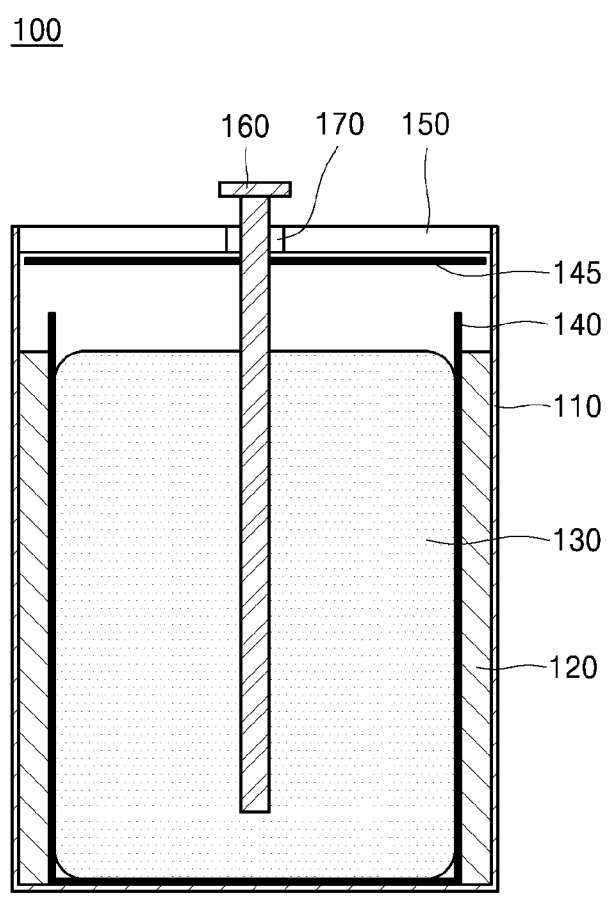
FIG. 1 is a cross-sectional view of a conventional lithium primary cell.
Figure 2:
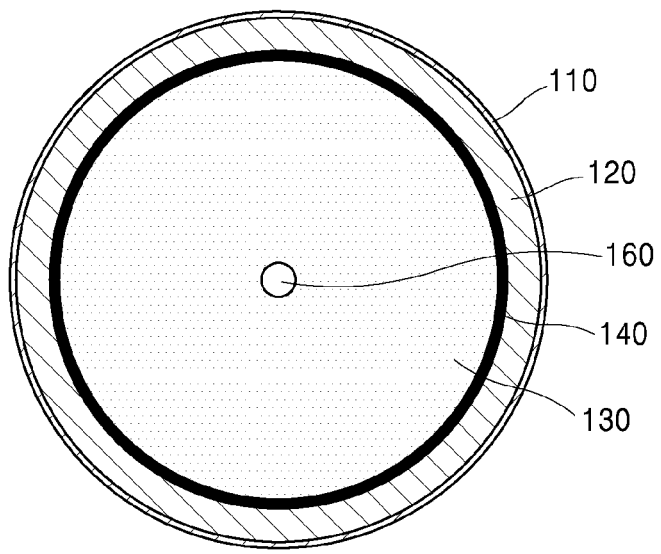
FIG. 2 is a plane view of the conventional lithium primary cell.

Advantages and features of the present disclosure and a method for achieving them will be apparent with reference to an embodiment described below together with the attached drawings. However, the present disclosure is not limited to the disclosed embodiment, but may be implemented in various manners, and the embodiment is provided to complete the disclosure of the present disclosure and to allow those of ordinary skill in the art to understand the scope of the present disclosure, and the present disclosure is defined by the category of the claims. Throughout the specification, an identical reference numeral will indicate an identical component.

Hereinafter, with reference to the accompanying drawings, a lithium primary battery having improved output characteristics and a method for manufacturing the lithium primary battery according to an embodiment of the present disclosure will be described in detail.

Figure 3:
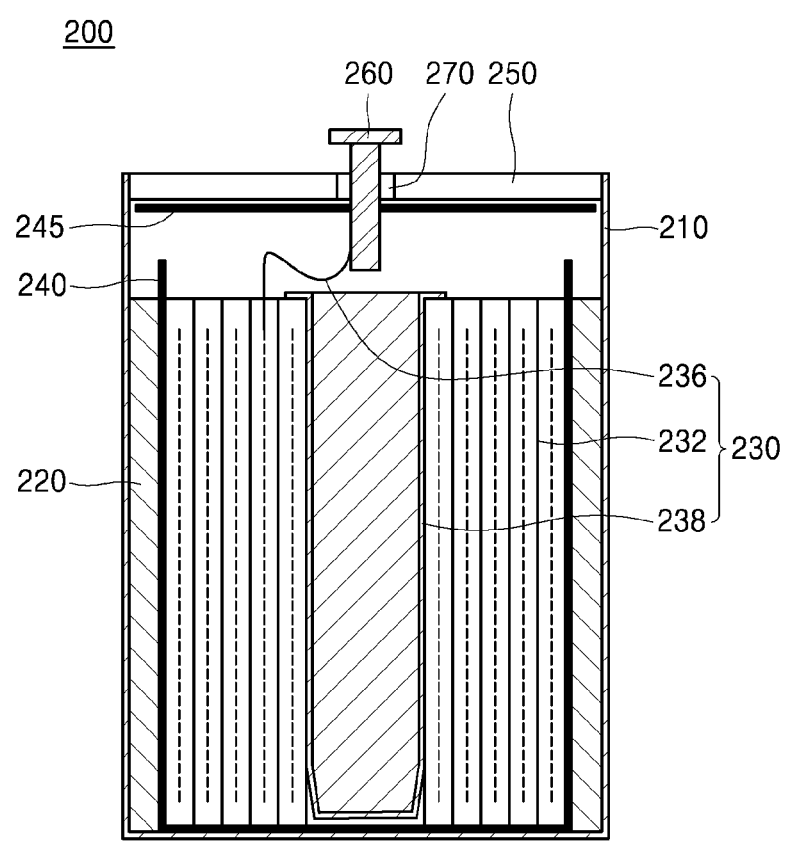
FIG. 3 is a cross-sectional view of a lithium primary battery having improved output characteristics, according to an embodiment of the present disclosure.
Figure 4:
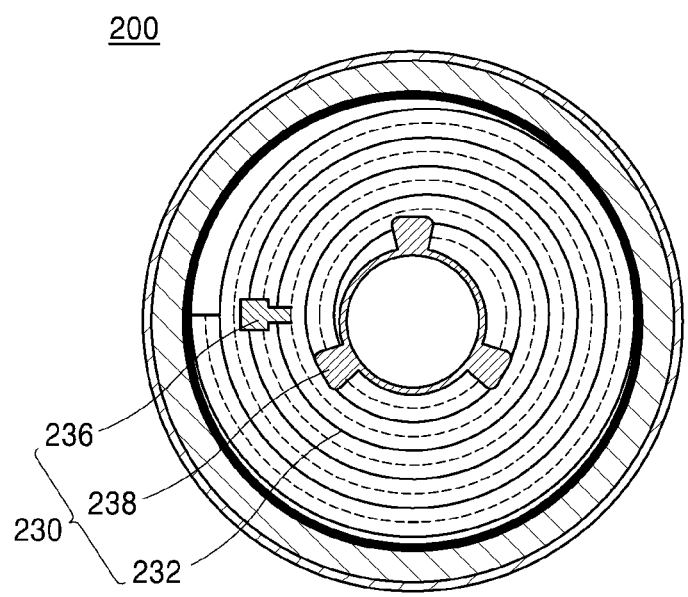
FIG. 4 is a plane view of the lithium primary battery having improved output characteristics, according to an embodiment of the present disclosure.

FIG. 3 is a cross-sectional view of a lithium primary battery having improved output characteristics, according to an embodiment of the present disclosure, and FIG. 4 is a plane view of the lithium primary battery having improved output characteristics, according to an embodiment of the present disclosure.

Referring to FIGS. 3 and 4, a lithium primary battery 200 having improved output characteristics according to an embodiment of the present disclosure may include a case 210, a lithium anode 220, a wound cathode 230, a separator 240, and a header 250.

The case 210 has an open top, and an electrolyte is impregnated therein. The case 210 may have a cylindrical shape having an open top, or may be designed to have a square shape such as a rectangular parallelepiped, a hexagonal column, etc. As a material of the case 210, stainless steel (steel use stainless (SUS)) may be used, without being limited thereto.

The electrolyte may include a solute and a solvent for dissolving the solute.

As the solute of the electrolyte, one or more kinds selected from LiAlCl4, LiGaCl4, or the like may be used, without being limited thereto. As the solute of the electrolyte, a material having a density of about 0.1 M through about 3.0 M may be preferably used. As the solvent of the electrolyte, one or more kinds selected from $SOCl_2$, $SO_2Cl_2$, or the like may be used. The lithium anode 220 may be attached to an inner wall of the case 210. The lithium anode 220 may be electrically separated from the wound cathode 230 by the separator 240.

The wound cathode 230 may be disposed in an inner center portion of the case 210 and may be wound at least twice. In this case, the wound cathode 230 may preferably have a thickness of about 0.1 mm through about 3 mm. When the thickness of the wound cathode 230 is less than about 0.1 mm, the thickness of a cathode active material layer is so thin that mesh may be exposed, resulting in a risk of internal short-circuit. On the other hand, when the thickness of the wound cathode 230 exceeds about 3 mm, winding is difficult to perform due to an excessive thickness design, and a resistance of the cathode active material layer increases, degrading electrical output characteristics.

The wound cathode 230 may include a cathode collector 232, a current collector 236, and an elastic member 238.

The cathode collector 232 may be wound at least twice to have a hollow in an inner center portion thereof.

The current collector 236 may be attached to at least one surface of the cathode collector 232 and may be electrically connected to the header pin 260 engaged with the header 250. To this end, the current collector 236 may be formed of, but not limited to, a metal material of one or more kinds selected from among aluminum, nickel, stainless steel, titanium, tantalum, and niobium.

The elastic member 238 may be disposed in a hollow portion of the cathode collector 232 to mutually fix wound parts of the cathode collector 232 wound at least twice. The elastic member 238 may be coupled to the hollow portion of the cathode collector 232 in a fit-coupling manner to physically fix the cathode collector 232. That is, the elastic member 238 may be fit-coupled to the hollow portion of the cathode collector 232 such that an external force may be physically applied to the cathode collector 232 by a restoring force exerted outwardly, thus stably fixing the cathode collector 232. As the elastic member 238, any metal material having elasticity may be used without a limitation and for example, a leaf spring may be used.

The separator 240 may be disposed between the lithium anode 220 and the wound cathode 230. The separator 240 may be disposed between the lithium anode 220 and the wound cathode 230 to electrically separate the lithium anode 220 from the wound cathode 230. In this case, as a material of the separator 240, a microporous film manufactured using a polymer of one or more kinds selected from a group consisting of glass fiber, polyethylene (PE), polypropylene (PP), polyvinylidenefluoride (PVDF), polyvinylidene chloride (PVDC), polyacrylonitrile (PAN), polyacrylamide (PAAm), polytetrafluoroethylene (PTFE), polysulfone, polyethersulfone (PES), polycarbonate (PC), polyamide (PA), polyimide (PI), polyethylene oxide (PEO), polypropylene oxide (PPO), a cellulose-based polymer, and polyacryl-based polymer may be used. As the separator 240, a multi-layer film that polymerizes porous films may be used.

The header 250 may cover a top of the case 210 to seal the case 210. The header 250 may be bonded to the case 210 using dot welding, laser welding, etc. In this case, the header 250 may be coupled with glass 270, and a header pin 260 may be engaged with a center portion of the header 250.

Although not shown specifically in the drawing, an electrolyte inlet (not shown) for impregnation of an electrolyte may be included in the header 250.

In the present disclosure, the lithium anode 210 and the separator 240 may be attached to the inner wall of the case 210 having the open top, and the wound cathode 230 wound at least twice may be inserted into the inner center portion of the case 210 having the lithium anode 210 and the separator 240 attached thereto. Thereafter, the top of the case 210 may be welded with the header 250, and the electrolyte may be impregnated into the case 210 through the electrolyte inlet of the header 250, after which the case 210 is finally sealed by welding with a sub-ball (not shown) that is a finishing material.

An upper insulation plate 245 may be further disposed on a bottom surface of the header 250. The upper insulation plate 245 may prevent the electrolyte inside the case 210 from leaking and also prevent the current collector 246 of the wound cathode 230 and the lithium anode 220 from being electrically short-circuited.

Figure 5:
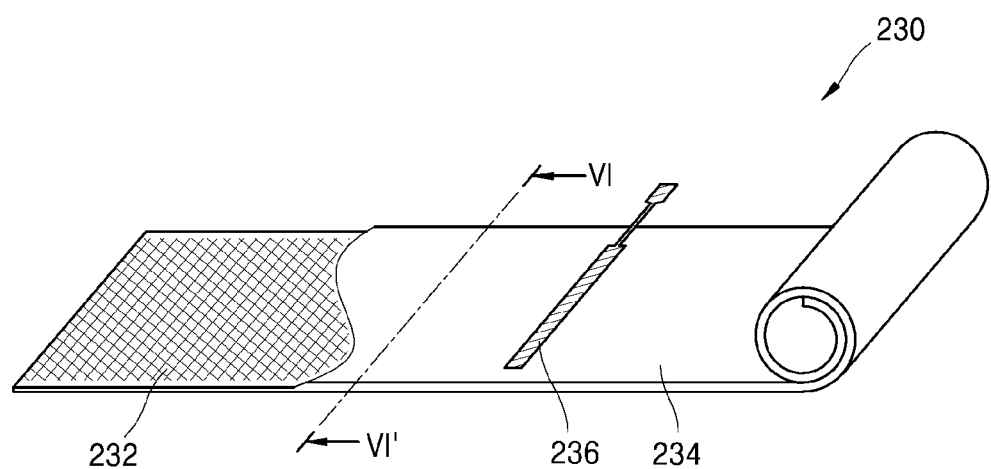
FIG. 5 is a schematic diagram for describing a process of manufacturing a wound cathode of FIG. 3.
Figure 6:
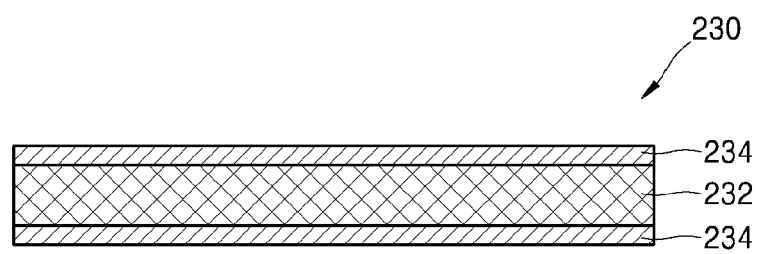
FIG. 6 is a cross-sectional view taken along a line VI-VI' of FIG. 5.

Meanwhile, FIG. 5 is a schematic diagram for describing a process of manufacturing a wound cathode of FIG. 3, and FIG. 6 is a cross-sectional view taken along a line VI-VI' of FIG. 5.

As shown in FIGS. 5 and 6, the wound cathode 230 may include the cathode collector 232, a cathode active material layer 234 coated on at least a surface of the cathode collector 232, and the current collector 236 attached to at least a surface of the cathode collector 232.

In this case, as the cathode collector 232, a metal foil, expanded metal, punching metal, nickel mesh, etc., may be used, among which nickel mesh may be preferably used.

The cathode active material layer 234 may be formed by mixing activated carbon, a conductive material, and a binder together with a solvent in a mixer for a slurry, applying the slurry thinly to the cathode collector 232 through a coating method using a comma coater, etc., and applying convective drying to the slurry to evaporate the solvent, thus attaching the slurry to the cathode collector 232.

Herein, as the activated carbon, one or more kinds selected from a hard wood base, a palm tree base, a coconut base, a petroleum pitch base, and a phenol base may be used. The conductive material may include conductive powder such as super-P, Ketjen black, carbon powder, acetylene black, carbon black, graphite, etc., among which carbon powder may be preferably used.

As the binder, a heterogeneous binder may be preferably used. More specifically, the binder having added thereto polytetrafluroethylene (PTFE), rubber-based resin, and acryl-based resin together may be preferably used. As a sub-binder of the binder, one or more kinds selected from among cellulose-based resin, fluoro-based resin including polyvinylidene fluoride (PVDF), thermoplastic resin including polyimide, polyamide-imide, polyethylene (PE), and polypropylene (PP), a carboxymethyl cellulose (CMC), and a mixture thereof may be further included.

Hereinbelow, a method for manufacturing a lithium primary battery having improved output characteristics according to an embodiment of the present disclosure will be described.

First, a lithium anode and a separator may be attached to an inner wall of a case having an open top.

Next, a wound cathode wound at least twice may be inserted into an inner center portion of the case having the lithium anode and the separator attached thereto.

In this case, the wound cathode may preferably include a cathode active material layer in which carbon powder is coated onto a cathode collector formed of nickel mesh.

In this stage, the wound cathode may further include a current collector attached to at least a surface of the cathode collector for connection to a header pin and an elastic member disposed in a hollow portion of the cathode collector to mutually fix wound parts of the cathode collector wound at least twice.

In this case, the wound cathode may be preferably formed to a thickness of about 0.1 mm through about 3 mm.

Herein, the elastic member may be coupled to the hollow portion of the cathode collector in a fit-coupling manner to physically fix the cathode collector. That is, the elastic member may be fit-coupled to the hollow portion of the cathode collector such that an external force may be physically applied to the cathode collector by a restoring force exerted outwardly, thus stably fixing the cathode collector. As the elastic member, any metal material having elasticity may be used without a limitation and for example, a leaf spring may be used.

Next, after the top of the case is covered with the header, an electrolyte may be injected, and the case may be sealed. That is, the top of the case may be welded with the header and then the electrolyte may be impregnated into the case through the electrolyte inlet of the header, after which the case may be finally sealed with a sub-ball (not shown) that is a finishing material.

Through such a process, the lithium primary battery having improved output characteristics according to an embodiment of the present disclosure may be manufactured.

As described so far, in the lithium primary battery having improved output characteristics and a method for manufacturing the lithium primary battery according to the present disclosure, the wound cathode in which the cathode collector coated with carbon powder is wound around nickel mesh is fixed by the elastic member disposed in the inner center portion of the case, thereby improving electrical output characteristics when compared to a conventional bobbin-type lithium primary cell.

Moreover, in the lithium primary battery having improved output characteristics and a method for manufacturing the lithium primary battery according to the present disclosure, by applying the wound cathode in which only the cathode, instead of all of a lithium anode, a separator, and the cathode, is wound, any shape change does not occur in the lithium anode and the separator, thus improving electrical output characteristics when compared to the conventional bobbin-type lithium primary cell without a change in an electrochemical capacity.

As a result, the lithium primary battery having improved output characteristics and a method for manufacturing the lithium primary battery according to the present disclosure may improve electrical output characteristics by maximizing an electrode area with insertion of the wound cathode, which is wound at least twice, into the inner center portion of the case.

Embodiment

Hereinbelow, the structure and action of the present disclosure will be described in more detail with reference to an embodiment of the present disclosure. However, this will be provided as a preferred example of the present disclosure, and is not interpreted as limiting the present disclosure in any sense.

A matter not described herein can be sufficiently technically construed by those of ordinary skill in the art and thus will not be described.

1. Manufacturing of Lithium Primary Battery

Embodiment 1

After a lithium cathode and a separator are attached to an inner wall of a case having an open top, a wound cathode wound five times to have a thickness of about 0.3 mm is inserted into an inner center portion of the case having the lithium cathode and the separator attached thereto.

In this case, as the wound cathode, a cathode active material layer in which carbon powder is coated onto a cathode collector formed of nickel mesh is used. The wound cathode includes a current collector attached to a surface of the cathode collector and an elastic member disposed in a hollow portion of the cathode collector to mutually fix wound parts of the cathode collector wound at least twice.

Next, after the top of the case is welded to a header, an electrolyte is injected into the case through an electrolyte inlet and the case is sealed, thus manufacturing the lithium primary battery.

Embodiment 2

Except for using the wound cathode having a thickness of about 1.0 mm, the same method as in Embodiment 1 is used to manufacture the lithium primary battery.

Embodiment 3

Except for using the wound cathode having a thickness of about 3.0 mm, the same method as in Embodiment 1 is used to manufacture the lithium primary battery.

Comparative Example 1

After a lithium cathode and a separator are attached to an inner wall of a case having an open top, a cathode molded in a cylindrical shape using granular molding is inserted into an inner center portion of the case having the lithium cathode and the separator attached thereto.

Next, after the top of the case is welded to a header, an electrolyte is injected into the case through an electrolyte inlet and the case is sealed, thus manufacturing the lithium primary battery.

2. Evaluation of Physical Properties

Figure 7:
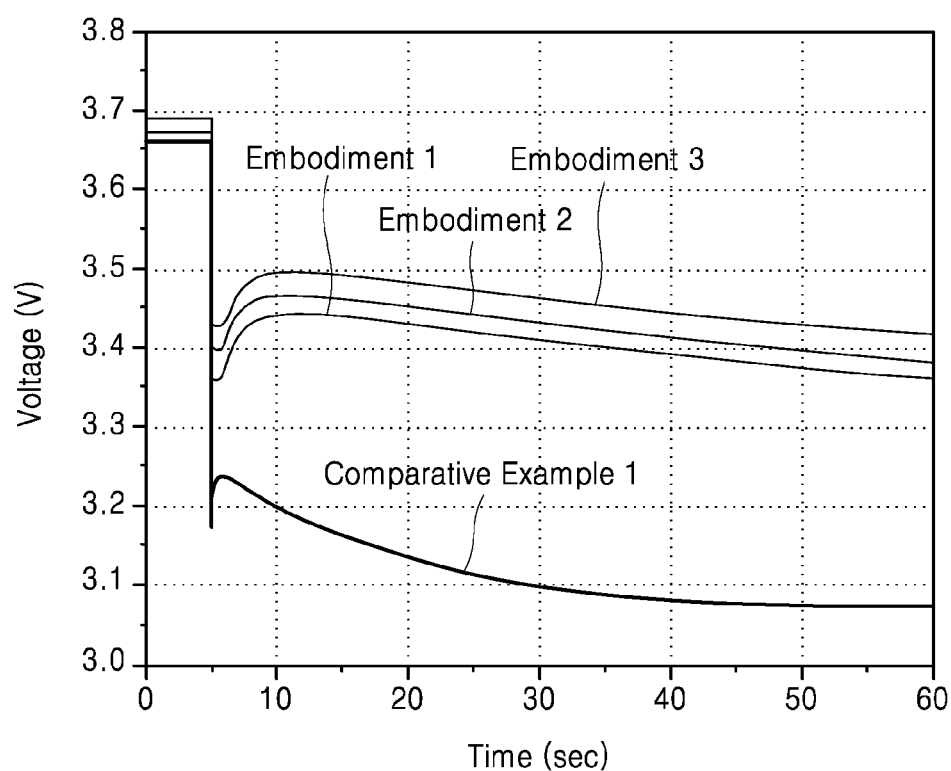
FIG. 7 is a graph showing a measured closed-circuit voltage with respect to a discharge progress of a lithium primary battery manufactured according to each of Embodiments 1 through 3 and Comparative Example 1.

FIG. 7 is a graph showing a measured closed-circuit voltage with respect to a discharge progress of a lithium primary battery manufactured according to each of Embodiments 1 through 3 and Comparative Example 1. For each of the lithium primary batteries manufactured according to Embodiments 1 through 3 and Comparative Example 1, a discharge voltage is measured at a temperature of about 25° C. by using a thermo-hygrostat product. The discharge voltage is evaluated under a condition of an electric current of about 200 mA by using a discharger of Maccor 4000 series.

As shown in FIG. 7, for the lithium primary battery manufactured according to Comparative Example 1, after an elapse of about 50 seconds from discharging of a constant current of about 200 mA, a closed-circuit voltage is about 3.1V.

On the other hand, for the lithium primary batteries manufactured according to Embodiments 1 through 3, after an elapse of about 50 seconds from discharging of a constant current of about 200 mA, a closed-circuit voltage is about 3.37V, about 3.40V, and about 3.43V, respectively.

As can be seen from the foregoing experimental results, the lithium primary batteries manufactured according to Embodiments 1 through 3 have electrical output characteristics that are definitely improved when compared to the lithium primary battery manufactured according to Comparative Example 1.

While the embodiment of the present disclosure has been mainly described so far, various changes or modifications can be made at the level of those of ordinary skill in the art. Such changes and modifications can be understood as falling within the present disclosure without departing from the technical spirit of the present disclosure. Accordingly, the scope of the present disclosure should be determined by the appended claims.

EXPLANATION OF NUMERAL REFERENCES

200: Lithium primary battery 210: Case
220: Lithium anode 230: Wound cathode
232: Cathode collector 234: Cathode active material layer
236: Current collector 238: Elastic member
240: Separator 250: Header
260: Header pin

The invention claimed is:

1. A lithium primary battery having improved output characteristics, the lithium primary battery comprising:
   a case comprising an open top and having an electrolyte impregnated therein;
   a lithium anode attached to an inner wall of the case;
   a cathode disposed in an inner center portion of the case;
   a separator disposed between the lithium anode and the cathode; and
   a header covering the top of the case to seal the case,
   wherein the cathode is wound and comprises: a cathode collector wound at least twice to form a hollow in an inner center portion of the cathode collector, with a cathode active material layer coated onto at least a surface of the cathode collector, and a current collector electrically connected to a header pin engaged with the header, and
   wherein the lithium anode and the separator are not wound.

2. The lithium primary battery of claim 1, wherein the cathode collector is formed of nickel mesh, and the cathode active material layer is formed of carbon powder.

3. The lithium primary battery of claim 1, wherein the cathode has a thickness of about 0.1 mm through about 3 mm.

4. The lithium primary battery of claim 1, wherein the cathode comprises:
   an elastic member disposed in the hollow of the cathode collector to mutually fix wound parts of the cathode collector.

5. The lithium primary battery of claim 4, wherein the elastic member is fit-coupled to the hollow of the cathode collector to fix the cathode collector.

6. A method for manufacturing a lithium primary battery, the method comprising:
   (a) attaching a lithium anode and a separator to an inner wall of a case having an open top;
   (b) inserting a wound cathode wound at least twice into an inner center portion of the case having the lithium anode and the separator attached thereto; and
   (c) after welding the top of the case with a header, injecting an electrolyte into the case through an electrolyte inlet of the header and sealing the case,
   wherein the wound cathode is wound and inserted into the inner center portion of the case, and the lithium anode and the separator are not wound.

7. The method of claim 6, wherein the wound cathode comprises a cathode active material layer in which carbon powder is coated onto a cathode collector formed of nickel mesh.

8. The method of claim 7, wherein the wound cathode is formed to have a thickness of about 0.1 mm through about 3 mm.

9. The method of claim 7, wherein in (b),
   the wound cathode comprises:
   a current collector attached to at least a surface of the cathode collector and connected to a header pin engaged with a header; and
   an elastic member disposed in a hollow portion of the cathode collector to mutually fix wound parts of the cathode collector wound at least twice.

10. The lithium primary battery of claim 1, wherein the header pin is not disposed in the hollow of the cathode collector.

11. The lithium primary battery of claim 1, wherein the header pin is electrically connected to the cathode collector by the current collector.

* * * * *